United States Patent
Hu et al.

(10) Patent No.: US 11,105,948 B2
(45) Date of Patent: Aug. 31, 2021

(54) DOWNHOLE TOOL ANALYSIS USING ANOMALY DETECTION OF MEASUREMENT DATA

(71) Applicant: Schlumberger Technology Corporation, Sugar Land, TX (US)

(72) Inventors: Bo Hu, Sugar Land, TX (US); Mark Flaum, Houston, TX (US); Jane Troutner, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 268 days.

(21) Appl. No.: 15/764,793

(22) PCT Filed: Sep. 26, 2016

(86) PCT No.: PCT/US2016/053648
§ 371 (c)(1),
(2) Date: Mar. 29, 2018

(87) PCT Pub. No.: WO2017/058688
PCT Pub. Date: Apr. 6, 2017

(65) Prior Publication Data
US 2018/0284313 A1 Oct. 4, 2018

Related U.S. Application Data

(60) Provisional application No. 62/235,071, filed on Sep. 30, 2015.

(51) Int. Cl.
*G01V 3/32* (2006.01)
*E21B 47/12* (2012.01)
(Continued)

(52) U.S. Cl.
CPC .............. *G01V 3/32* (2013.01); *E21B 47/12* (2013.01); *G01N 24/081* (2013.01); *G06F 17/15* (2013.01); *G06K 9/6215* (2013.01); *G06K 9/6223* (2013.01)

(58) Field of Classification Search
CPC .......... E21B 47/12; G06F 17/15; G01V 3/32; G06K 9/6223; G06K 9/6215; G01N 24/081
See application file for complete search history.

(56) References Cited

U.S. PATENT DOCUMENTS

| 6,787,758 B2 | 9/2004 | Tubel et al. |
| 2009/0166031 A1 | 7/2009 | Hernandez |

(Continued)

OTHER PUBLICATIONS

International Preliminary Report on Patentability issued in International Patent application PCT/US2016/053648, dated Apr. 4, 2018, 11 pages.

(Continued)

*Primary Examiner* — Stephanie E Bloss

(57) ABSTRACT

A method and system for detecting an anomaly in measurement data captured by a downhole tool is disclosed provided. In the method and system, measurement data comprising a plurality of measurement channels is obtained and reference data including healthy reference data and faulty reference data is also obtained. The measurement data is preprocessed by modeling at least one measurement channel of the plurality of measurement channels using modeling parameters to produce pre-processed measurement data. Further, a first distance between the pre-processed measurement data and the healthy reference data is obtained and determined to exceed a first threshold for the first distance. A report is generated in response to determining that the first distance exceeds the first threshold. The report indicates detection of the anomaly in the measurement data.

14 Claims, 9 Drawing Sheets

(51) Int. Cl.
  *G06F 17/15* (2006.01)
  *G01N 24/08* (2006.01)
  *G06K 9/62* (2006.01)

(56) References Cited

U.S. PATENT DOCUMENTS

| | | | |
|---|---|---|---|
| 2010/0042327 A1* | 2/2010 | Garvey | E21B 47/00 702/11 |
| 2010/0082258 A1 | 4/2010 | Wang | |
| 2011/0022354 A1* | 1/2011 | Kumar | G06K 9/6284 702/179 |
| 2011/0153236 A1* | 6/2011 | Montreuil | G01R 19/2513 702/59 |
| 2012/0245481 A1* | 9/2012 | Blanco | A61B 5/7264 600/544 |
| 2012/0290208 A1 | 11/2012 | Jiang et al. | |
| 2012/0323494 A1* | 12/2012 | Lovell | E21B 47/103 702/6 |
| 2013/0046157 A1* | 2/2013 | Addison | A61B 5/0082 600/323 |
| 2014/0062495 A1* | 3/2014 | Carter | H01J 37/08 324/459 |
| 2015/0314068 A1* | 11/2015 | Alderete, Jr. | G16H 20/17 604/500 |
| 2015/0347698 A1* | 12/2015 | Soni | G16H 50/20 706/11 |
| 2015/0363925 A1* | 12/2015 | Shibuya | F01D 25/00 345/440 |
| 2017/0104657 A1* | 4/2017 | Gopalakrishnan | G06K 9/622 |

OTHER PUBLICATIONS

Brieman et al., Classification and Regression Trees. Chapman Hall, Boca Raton, FL, 1984, 72 pages.
International Search Report and Written Opinion issued in International Patent application PCT/US2016/053648, dated Dec. 14, 2016. 16 pages.
Mahalanobis, P.C., "On the generalised distance in statistics," Proceedings of the National Institute of Sciences of India, vol. 2, pp. 49-55, Apr. 16, 1936.
Breiman, Leo, "Random Forests," Machine Learning, vol. 45, pp. 5-32, 2001.
Hastie et al., The elements of statistical learning: Data mining, inference, and prediction. New York: Springer Verlag, 2001. pp. 587-601.

* cited by examiner

Measurement Data

| Channel 1 Depth (202) | Channel 2 Time (204) | Channel 3 NMR Measurement (206) | Channel 4 Antenna Tuning Measurement (208) | Channel 5 Downhole Tool Measurement (210) | Channel 6 Antenna Resonant Frequency (212) |
|---|---|---|---|---|---|
| . . . | . . . | . . . | . . . | . . . | . . . |
| 1000m | 19 hrs | [ 500, 426, 399, ... ] | [ 102, 97, ... ] | 20 C° | 80 MHz |
| . . . | . . . | . . . | . . . | . . . | . . . |

*FIG. 2*

DOWNHOLE TOOL ANALYSIS USING ANOMALY DETECTION OF MEASUREMENT DATA

CROSS-REFERENCE TO RELATED APPLICATIONS

The present application claims priority to U.S. Provisional Application 62/235,071, filed Sep. 30, 2015, the entirety of which is incorporated by reference.

FIELD OF THE INVENTION

Some embodiments described herein generally relate to systems and apparatuses for downhole tool analysis. Additional embodiments described herein generally relate to methods for downhole tool analysis based on anomaly detection of measurement data.

BACKGROUND

Downhole tools are used for exploring oil and natural gas deposits under the Earth's surface. A downhole tool may be equipped with a number of sensors that capture measurements used for determining the viability of oil or natural gas exploration. A downhole tool may be used in a logging-while-drilling operation, whereby various measurements are captured as the tool drills and descends under the surface of the Earth. During operation, malfunction of the downhole tool causes noise and other artifacts to be introduced in the measurements captured by the downhole tool. The noise and artifacts corrupt the captured data. The noise and artifacts also result in uncertainty in determinations by exploration personnel as to whether an explored area includes oil or gas deposits. Maintenance and repair of the downhole tool ahead of drilling mitigate the noise or artifacts introduced in the captured measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for detecting an anomaly in measurement data captured by a downhole tool is disclosed. Measurement data comprising a plurality of measurement channels for a time point of a plurality of time points is obtained. Reference data including healthy reference data and faulty reference data is also obtained. The measurement data is pre-processed by modeling at least one measurement channel of the plurality of measurement channels using modeling parameters to produce pre-processed measurement data. The method includes determining a first distance between the pre-processed measurement data and the healthy reference data and determining that the first distance exceeds a first threshold for the first distance. The method also includes generating a report indicating detection of the anomaly in the measurement data in response to determining that the first distance exceeds the first threshold for the first distance.

A system that includes a measurement data storage that stores measurement data comprising a plurality of measurement channels is disclosed. The system also includes a reference data storage that stores healthy reference data and faulty reference data and a detection system that is coupled to the measurement data storage and the reference data storage. The detection system obtains the measurement data from the measurement data storage and the healthy reference data and the faulty reference data from the reference data storage. The detection system pre-processes the measurement data by modeling at least one measurement channel of the plurality of measurement channels using modeling parameters to produce pre-processed measurement data. The detection system determines a first distance between the pre-processed measurement data and the healthy reference data. The detection system also determines that the first distance exceeds a first threshold for the first distance and outputs a report indicating detection of an anomaly in the measurement data in response to determining that the first distance exceeds the first threshold.

A method for detecting an anomaly in measurement data captured by a downhole tool includes obtaining the measurement data, whereby the measurement data includes a plurality of measurement channels for a time point of a plurality of time points at which measurements were recorded. The method includes obtaining reference data including healthy reference data and faulty reference data and training a classification algorithm using the healthy reference data and faulty reference data. The at least one measurement channel of the plurality of measurement channels is modelled using modeling parameters. Pre-processed measurement data is produced based on modelling the at least one measurement channel of the plurality of measurement channels. The method includes determining whether the measurement data is classified as healthy or faulty based at least in part on evaluating the pre-processed measurement data using the classification algorithm. The method further includes outputting a report indicating that the measurement data is faulty in response to determining that the measurement data is classified as faulty.

BRIEF DESCRIPTION OF THE SEVERAL VIEWS OF THE DRAWINGS

In the drawings, sizes, shapes, and relative positions of elements are not drawn to scale. For example, the shapes of various elements and angles are not drawn to scale, and some of these elements may have been arbitrarily enlarged and positioned to improve drawing legibility.

FIG. 2 depicts an example of measurement data recorded by the downhole tool according to one or more embodiments disclosed herein;

DETAILED DESCRIPTION

Figure 1:
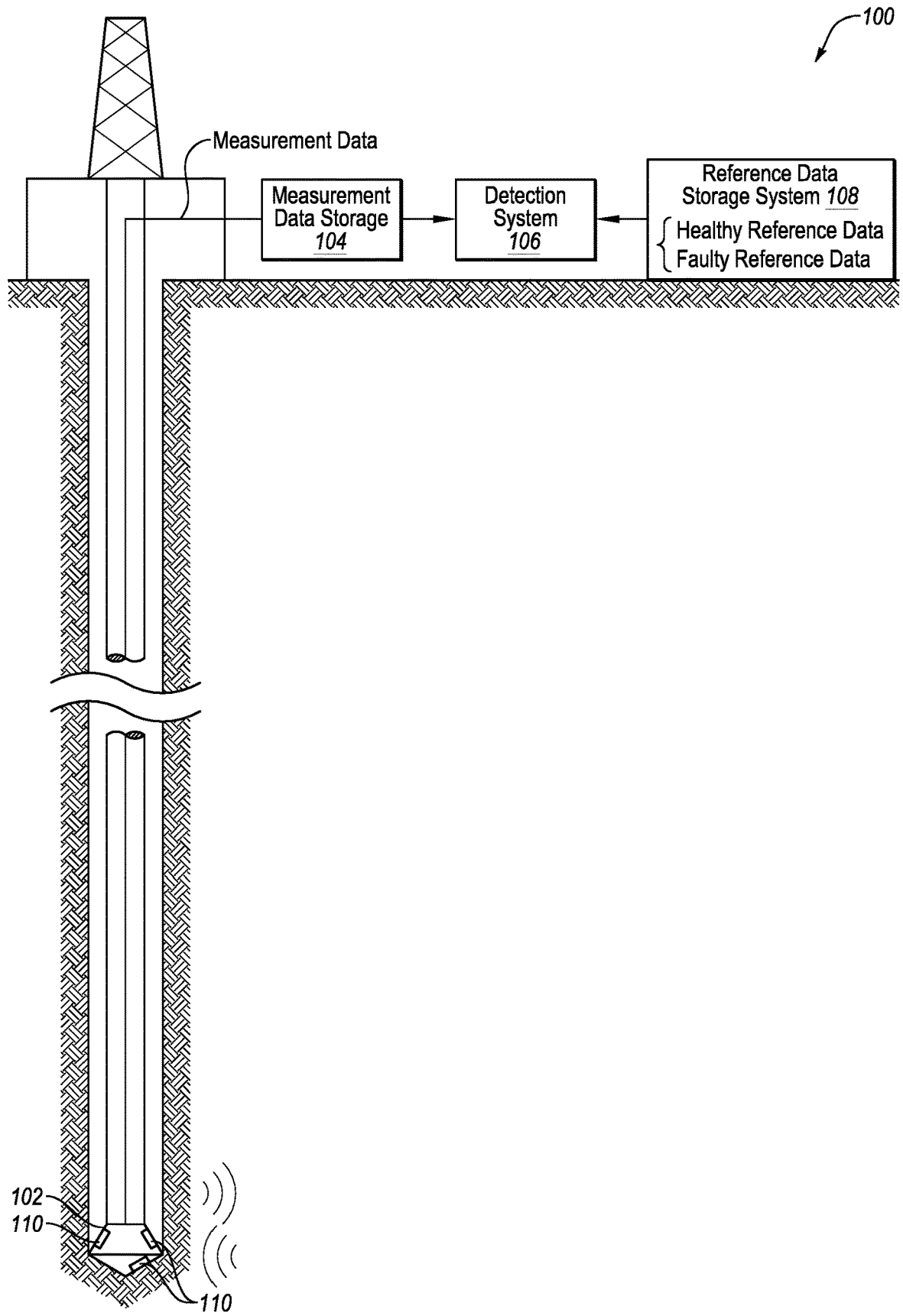
FIG. 1 depicts an environment for downhole tool health prognosis in a drilling operation according to one or more embodiments disclosed herein.

FIG. 1 depicts an environment 100 for downhole tool 102 health prognosis in a drilling operation according to one or more embodiments disclosed herein. The environment 100 includes a downhole tool 102, a measurement data storage system 104, a detection system 106 and a reference data storage system 108. The downhole tool 102 further includes a plurality of sensors 110 (singularly referred to herein as sensor 110). The downhole tool 102 may, for example, be a drilling apparatus used for exploration of oil or gas under the Earth's surface.

The sensors 110 of the downhole tool 102 may be used to capture measurements at various depths of a borehole in a logging-while-drilling environment. The sensors 110, which may be antennas or detectors, may perform Nuclear Magnetic Resonance (NMR) measurements. Nuclear Magnetic Resonance enables measuring the porosity and permeability of the Earth's rock and characterizing pore spaces in a drilling environment and the fluid in the pore spaces. In addition, the downhole tool 102 may make various other measurements such as the temperature of the downhole tool 102 and sensor or antenna resonant frequency.

In Nuclear Magnetic Resonance (NMR) measurements, early echo ringing introduces undesirable artifacts in the measured data. The artifacts result from excess energy or voltage captured by a sensor 110. The ringing leads to uncertainty about the measured data and introduces noise in the recorded data. The noise may hinder an operator's ability to use the data for detecting the presence of natural resources under the Earth's surface. Reducing the noise introduced by the downhole tool 102 results in the recorded data more accurately reflecting the sought measurements. The data captured by the downhole tool 102 is evaluated to detect an anomaly or failure as described herein. If an anomaly or failure is detected, the downhole tool 102 may be serviced or repaired to mitigate or eliminate the introduced artifacts. More reliable measurement data may then be obtained by the downhole tool 102.

Still referring to FIG. 1, the measurement data captured by the downhole tool 102 is stored in the measurement data storage system 104. The measurement data storage system 104 may be any type of device capable of storing data, such as a hard drive or solid-state drive, among others. The measurement data may be provided to the measurement data storage system 104 as measurement are made in real-time. For example, as the downhole tool 102 descends deeper and makes measurements at various depths, the measurement data may be sent to the measurement data storage system 104. The measurement data may be sent wirelessly over any type of wireless link. Further, the measurement data may also be sent over a wired link. The measurement data may be stored locally by the downhole tool 102 and may be provided to the measurement data storage system 104 once the measurements for an entire depth of a well are completed.

The measurement data may then be provided to the detection system 106. The detection system 106 may include one or more computational resources, memory resources and/or networking resources, among others. For example, the detection system 106 may be a computer or a server. The detection system 106 evaluates the measurement data to determine whether an anomaly or failure is present in the measurement data. The detection system 106 may be coupled to the reference data storage system 108. The reference data storage system 108 stores both healthy reference data and faulty reference data. The healthy reference data may be a sample of measurement data identified as being healthy. The healthy reference data may, for example, be previously made measurement data identified as having no or minimal early echo ringing artifacts or other noise introduced by the downhole tool 102. The healthy reference data may be used as a baseline as described herein for comparison with the measurement data. Based on the comparison, a degree of similarity between the measurement data and the healthy reference data may be determined and used for identifying whether the measurement data may be classified as healthy. If the measurement data is classified as healthy, it may be concluded the downhole tool 102 is operating as desired and may not need repair or maintenance.

Similarly, the faulty reference data may be a sample of measurement data identified as being faulty. The faulty reference data may, for example, be a previously made data measurement identified as having a high degree of early echo ringing or other artifacts. The faulty reference data may be used as a baseline for comparison with the measurement data and determining whether the measurement data may be classified as faulty.

The measurement data may be categorized as an anomaly if the measurement data deviates from the healthy references data. The measurement data may be categorized as faulty if the measurement data corresponds to the properties of the faulty reference data.

FIG. 2 depicts an example of measurement data made by the downhole tool 102 according to one or more embodiments disclosed herein. At various depths, the downhole tool 102 may make various measurements. The measurements are shown to include a depth measurement 202, a time measurement 204, a Nuclear Magnetic Resonance measurement 206, an antenna tuning measurement 208, a tool temperature measurement 210 and an antenna resonant frequency 212. It is recognized that the measurements shown in FIG. 2 are exemplary and in various embodiments additional or different measurements may be made and recorded. The measurements are shown in FIG. 2 for one depth or time point. However, as may be recognized, the measurement data includes measurements that are made at a plurality of depths or time points.

At each depth some of the measurements may be array measurements that are represented by a vector or a string of values. For example, as shown in FIG. 2, the Nuclear Magnetic Resonance measurement 206 and the antenna tuning measurement 208 are each array measurements that are represented by a plurality of values for each depth measurement 202 or time measurement 204. The depth measurement 202 may represent the depth to which the downhole tool 102 descended or at which the various other measurements were made. The time measurement 204 may represent the length of time that elapsed from the time at which the downhole tool 102 began its descent. On the other hand, the tool temperature measurement 210, as well as the antenna resonant frequency, may be represented by single quantity as opposed to an array. Each type of measurement made by the downhole tool 102 is referred to herein as a channel.

After collecting and recording the measurement data by the downhole tool 102, the data may be pre-processed ahead of detecting whether the measurement data is to be categorized as faulty or as anomalous. Pre-processing the measurement data may be performed by the detection system 106 described with reference to FIG. 1. In alternative embodiments, a separate pre-processing system may be provided for pre-processing the measurement data. The data that is pre-processed by the pre-processing system may then be provided to the detection system 106 for evaluation. Similar to the detection system 106, the pre-processing system may include computational resources. The pre-processing system may be any type of computer equipped with a processor. For example, the pre-processing system may be a laptop computer that is equipped with a central processing unit (CPU).

Pre-processing the measurement data reduces the volume of the measurement data used for anomaly or fault detection. Pre-processing the measurement data also makes anomaly or fault detection more computationally efficient. That is because the detection system evaluates a smaller set of pre-processed measurement data to detect an anomaly or fault as opposed to a larger set of captured measurement data. Pre-processing may remove redundancies in the measurement data and model the measurement data or channels thereof using modeling parameters.

Figure 3:
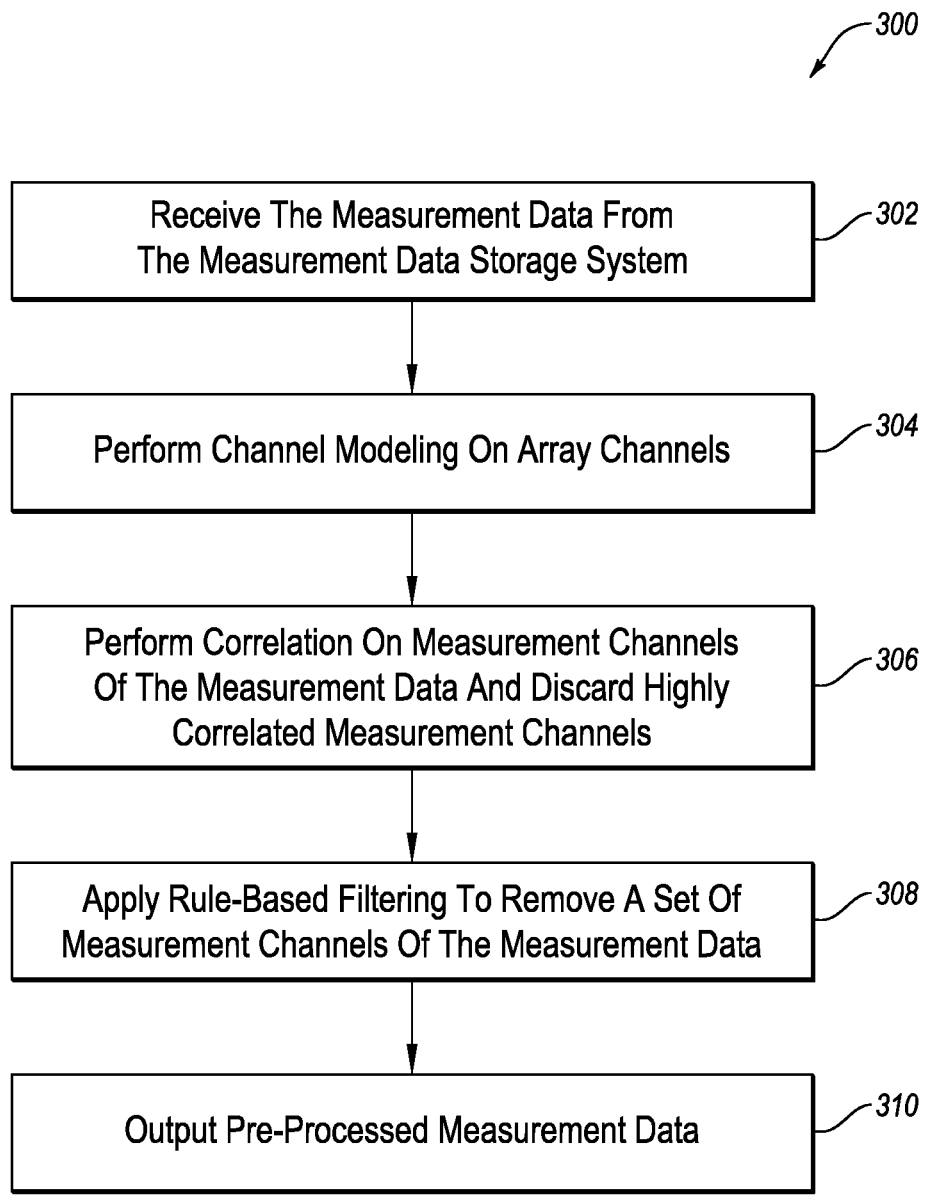
FIG. 3 depicts a flow diagram of a method for pre-processing measurement data according to one or more embodiments disclosed herein.

FIG. 3 depicts a method for pre-processing measurement data according to one or more embodiments disclosed herein. In the method 300, the detection system 106 described with reference to FIG. 1 receives, at block 302, the measurement data from the measurement data storage system. The measurement data as described herein includes channels that are represented by arrays of multiple quantities. For example, the Nuclear Magnetic Resonance measurement 206 may include over a thousand samples for each depth. At block 304, the detection system 106 performs channel modeling on array channels. Different types of channels may be modeled differently. For example, the Nuclear Magnetic Resonance echo measurement channel data may be a logarithmic decay and log-linear fitting may be used to represent the measurement data more compactly. In log-linear fitting, the logarithmic decay data may be segmented into two or more segments and each segment may be represented by modeling parameters, such as an intercept and a slope for the segment. Further, an indication of a residual value of the measured Nuclear Magnetic Resonance to the fitted line may be provided for each segment.

Accordingly, an array of several hundred or thousand measurements may be modeled and represented by a much smaller number of modeling parameters. Some measurement channels may be frequency responses that are modeled using a peak amplitude of the measured data and a frequency at the peak amplitude of the measured data. Thus, an array of hundreds of measurements may be represented using the two modeling parameters of peak amplitude and frequency.

At block 306, the detection system 106 performs correlation on the channels of the measurement data and discards highly correlated measurement channels. A high correlation, as measured by a correlation coefficient of near 1 or near −1, between a first measurement channel and a second measurement channel indicates that the first measurement channel is a linear transformation of the second measurement channel or vice-versa. Accordingly, utilizing both measurement channels may be redundant and one of the two measurement channels may be removed from further evaluation.

The detection system 106 then applies rule-based filtering to remove a set of measurement channels of the measurement data at block 308. For example, certain measurement channels of the measurement data may not factor in determining whether the measurement data is faulty. These measurement channels may be removed from the pre-processed measurement data set. The detection system 106 then outputs the pre-processed measurement data 310.

The pre-processed measurement data is evaluated by the detection system 106 to determine whether the measurement data is to be classified as faulty or anomalous. The measurement data is classified as faulty if the measurement data is determined to have attributes that correspond to those of the faulty reference data. Further, the measurement data is classified as anomalous if the measurement data is determined to have attributes that are different than those of the healthy reference data.

Two techniques are described herein for classifying the measurement data. In the first technique, a clustering algorithm, such as the Mahalanobis distance, is used for determining whether the measurement is to be classified as faulty or anomalous. For example, the Mahalanobis distance between the pre-processed measurement data and the healthy reference data or between the pre-processed measurement data and the faulty reference data may be obtained and used for determining whether the measurement is to be classified as faulty or anomalous. In the second technique, a classification algorithm, such as the classification and regression tree (CART) algorithm or the random forest algorithm, is trained with the healthy reference data and the faulty reference data. After the training, the classification algorithm is used to classify the pre-processed measurement data. Reference is made herein to T. Hastie, R. Tibshirani and J. H. Friedman, "The elements of statistical learning: Data mining, inference, and prediction," New York: Springer Verlag, 2001, L. Breiman, J. H. Friedman, R. A. Olshen, and C. J. Stone, "Classification and regression trees," Monterey, Calif.: Wadsworth & Brooks/Cole Advanced Books & Software, 1984 and L. Breiman, "Random Forests," Machine Learning, Vol. 45, pp. 5-32, 2001, which describe the CART algorithm and the random forest algorithm, among others, and are hereby incorporated by reference herein in their entirety as if fully set forth.

Figure 4:
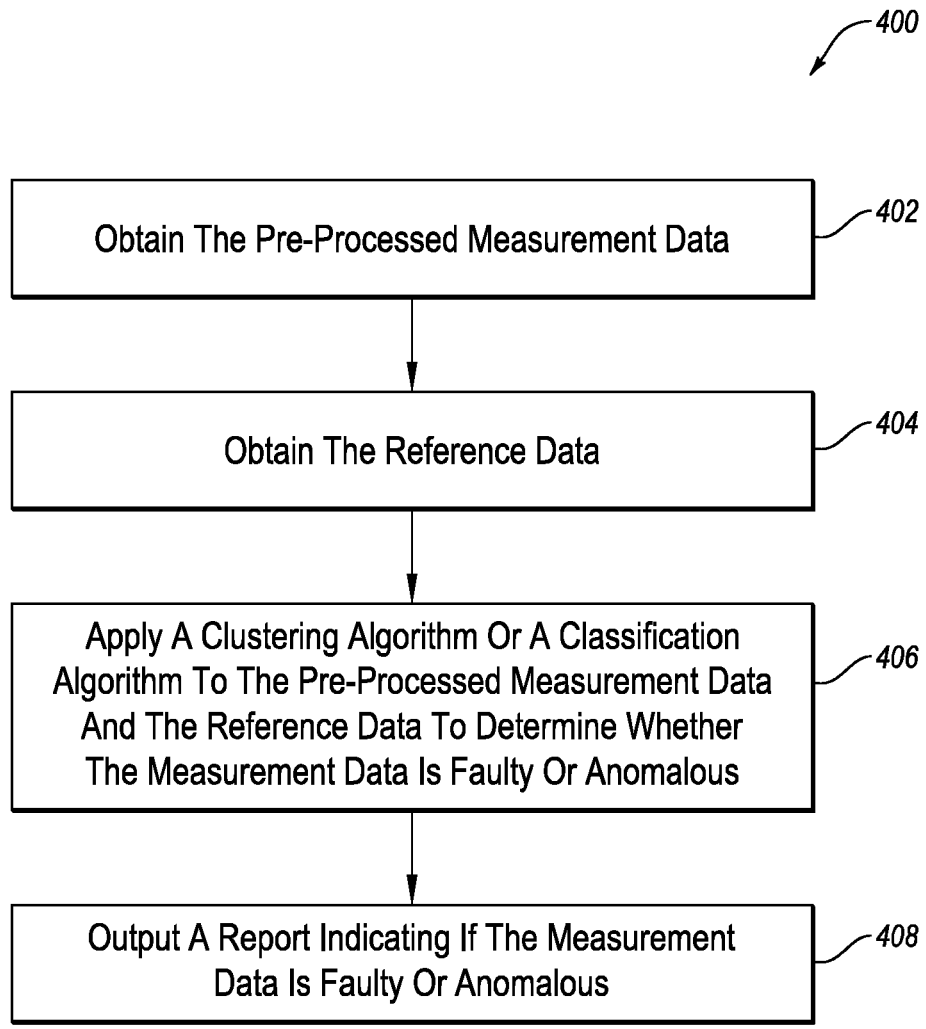
FIG. 4 depicts a flow diagram of a method for classifying the measurement data according to one or more embodiments disclosed herein.

FIG. 4 depicts a flow diagram of a method for classifying the measurement data according to one or more embodiments disclosed herein. In the method 400, the detection system 106 obtains the pre-processed measurement data at block 402. As described herein, the recorded measurement data may be compressed and the redundancies of the measurement data may be removed to obtain the pre-processed measurement data.

The detection system 106 then obtains, at block 404, the reference data, which includes the healthy reference data and the faulty reference data. At block 406, the detection system 106 applies a clustering algorithm or a classification algorithm to the pre-processed measurement data and the reference data to determine whether the measurement data is faulty or anomalous. As described herein, the clustering algorithm may be the Mahalanobis distance and the classification algorithm may be the CART algorithm or a random forest algorithm. At block 408, the detection system 106 outputs a report indicating if the measurement data is faulty or anomalous. The report may be used for determining whether the downhole tool 102 is to be serviced or repaired, for example, if the data is classified as anomalous or faulty.

Figure 5:
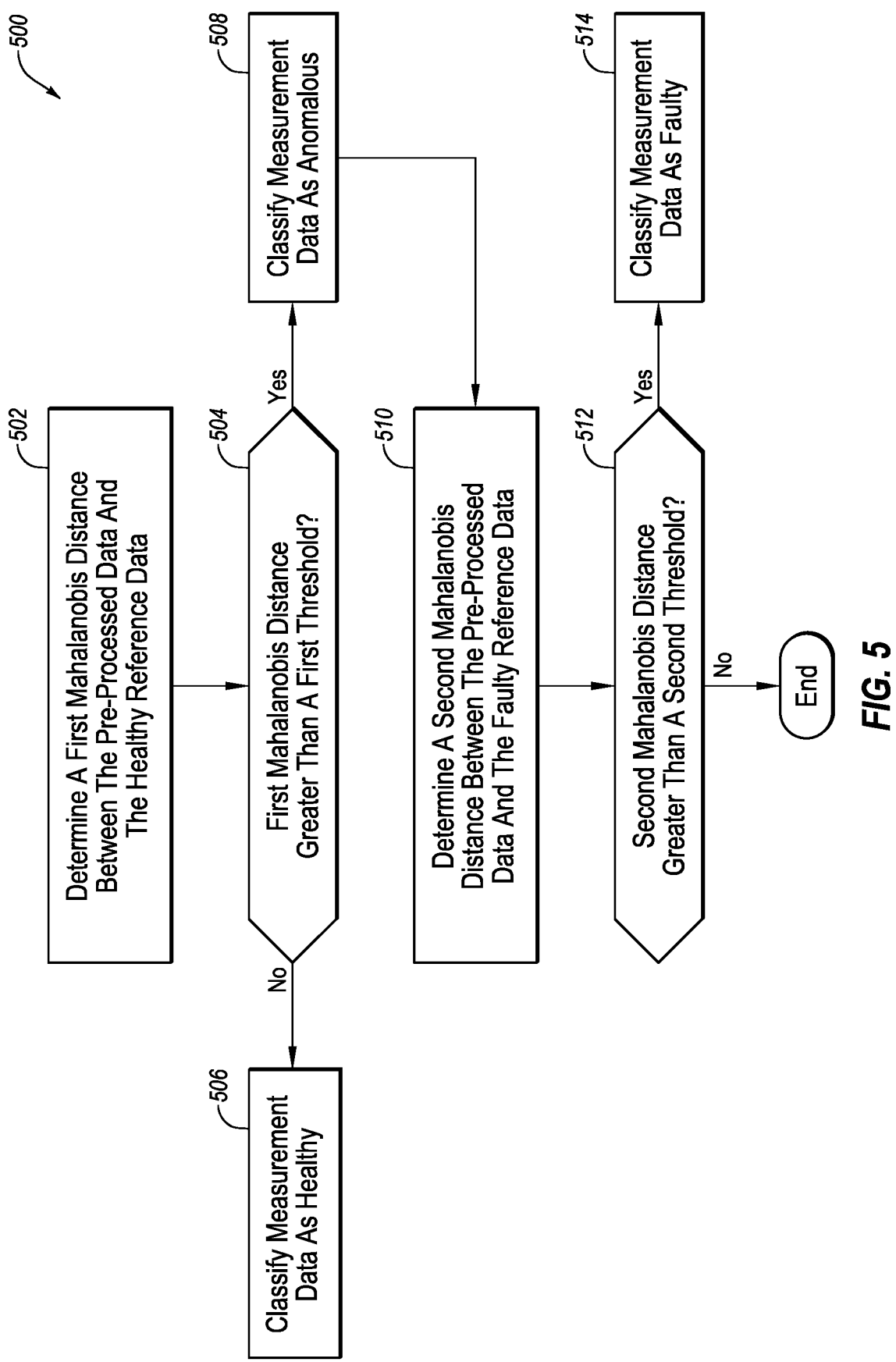
FIG. 5 depicts a flow diagram of a method for performing a Mahalanobis distance analysis on the measurement data according to one or more embodiments disclosed herein.

FIG. 5 depicts a flow diagram of a method for performing a Mahalanobis distance analysis according to one or more embodiments disclosed herein. In the method 500, the detection system 106 determines a first Mahalanobis distance 502 between the pre-processed measurement data and the healthy reference data. The first Mahalanobis distance is determined as:

$$MD_1(\vec{x},\vec{y}) = \sqrt{(\vec{x}-\vec{y})^T S^{-1}(\vec{x}-\vec{y})} \quad \text{(Equation (1))}$$

where $\vec{x}$ is a vector that includes the pre-processed measurement data, $\vec{y}$ is a vector that includes the healthy reference data, S is the covariance matrix, $(.)^{-1}$ represents the matrix inverse operator and $(.)^T$ represents the transpose operator.

The Mahalanobis distance between the pre-processed measurement data and the healthy reference data is indicative of the deviation of the pre-processed measurement data from the healthy reference data. A relatively small Mahalanobis distance is indicative of relatively high degree of similarity between the pre-processed measurement data and the healthy reference data. Conversely, a relatively high Mahalanobis distance is indicative of a relatively low degree of similarity between the pre-processed measurement data and the healthy reference data.

A first threshold for the first Mahalanobis distance is set or established such that if the first Mahalanobis distance exceeds the first threshold, the pre-processed measurement data is classified as anomalous. Conversely, if the first Mahalanobis distance does not exceed the first threshold, the pre-processed measurement data is classified as healthy. As may be recognized, reducing the first threshold increases the likelihood of false positives, i.e., mistakenly classifying pre-processed measurement data as anomalous when in fact the pre-processed measurement data is healthy. The first threshold for the first Mahalanobis may be set such that 99% of Mahalanobis distances calculated for various trials of measurement data are below the first threshold and only 1% are equal to or above the first threshold. Furthermore, in a less restrictive scenario, the first threshold may be set such that 95% of Mahalanobis distances calculated for various trials of measurement data are below the first threshold and 5% are above the first threshold.

Following determining the first Mahalanobis distance, the detection system 106 determines whether the first Mahalanobis distance is greater than the first threshold 504. If a positive determination is made, the pre-processed measurement data is classified as anomalous 508 and if a negative determination is made, the pre-processed measurement data is classified as healthy 506.

The first Mahalanobis distance may be calculated for every depth for which data measurements are obtained by the downhole tool 102. The vector $\vec{x}$ may include the pre-processed measurement data for the depth, whereas the vector $\vec{y}$ may include the healthy reference data for the depth. The downhole tool 102 may make measurement at hundreds or thousands of depths or time points and the first Mahalanobis distances may be obtained for each depth or time point.

If the pre-processed measurement data is classified as anomalous, the pre-processed measurement data may be further evaluated to determine whether the pre-processed measurement data has similar attributes as those of the faulty reference data and may be further classified as faulty. It is noted that classifying the pre-processed measurement data as anomalous with respect to the healthy reference data facilitates analyzing the downhole tool 102. The anomaly may trigger assessment and analysis of the downhole tool 102 for the presence of a malfunction. Accordingly, evaluating whether the pre-processed measurement data is to be categorized faulty as described herein may be forgone.

The detection system 106 determines a second Mahalanobis distance between the pre-processed data and the faulty reference data 510. Similar to the first Mahalanobis distance, the second Mahalanobis distance may be determined as:

$$MD_2(\vec{x},\vec{z}) = \sqrt{(\vec{x}-\vec{z})^T S^{-1}(\vec{x}-\vec{z})} \quad \text{(Equation (2))}$$

where $\vec{x}$ is a vector that includes the pre-processed measurement data for a certain depth 202 or time point 204 and $\vec{z}$ is a vector that includes the faulty reference data for the depth 202 or time point 204 and S is the covariance matrix.

At every depth 202 or time point 204, the second Mahalanobis distance ($MD_2$) may be determined. The detection system 106 then determines whether the second Mahalanobis distance is greater than a second threshold 512. If the second Mahalanobis distance is determined to be greater than the second threshold, then the process ends and the pre-processed measurement data, for example, for the depth 202, remains classified as anomalous. Conversely, if a negative determination is made, the pre-processed measurement data is classified as faulty 514.

It is noted that another clustering algorithm, such as K-means clustering, may be used to classify the measurement data and determine whether the measurement data is healthy or faulty. Further, a different multi-dimensional distance metric may be used in place of the Mahalanobis distance for determining the distance between the measurement data and the healthy or faulty reference data.

Figure 6:
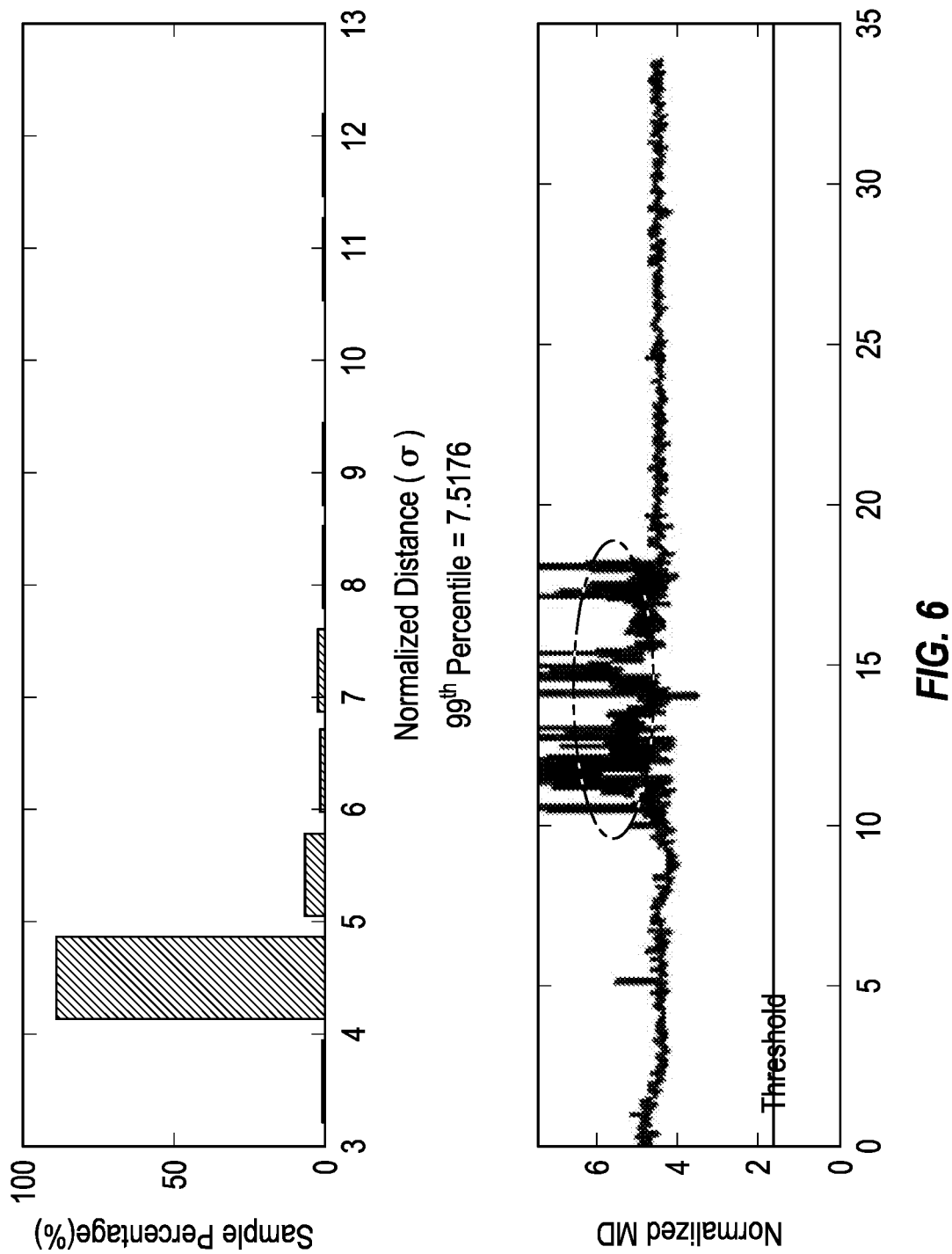
FIG. 6 depicts an example of a distribution of the Mahalanobis distances of measurement data of a drilling operation according to one or more embodiments disclosed herein.

FIG. 6 depicts an example of a distribution of the Mahalanobis distances of measurement data of a drilling operation according to one or more embodiments disclosed herein. The distribution of the Mahalanobis distances for data measurements made at various time points indicates that about 90% of the Mahalanobis distances are between 4 and 5. Further, only 1% of the Mahalanobis distances are greater than 7.52. Further, temporally plotting the Mahalanobis distances shows indicates that failure was observed in the measurements made between the 10th and 19th hour of the drilling operation as represented by spikes of the Mahalanobis distances for these measurement. Outside of the range between the 10th and 19th hour, a failure was not detected.

It is noted that the Mahalanobis distance may be used for predicting failure. For example, if the Mahalanobis distance is detected to be trending higher with respect to time, the upward trend in the Mahalanobis distance may be used to forecast an upcoming failure.

The detection system may use the classification and regression tree (CART) algorithm described herein for determining whether measurement data is faulty or anomalous. The CART algorithm may be trained by the healthy and faulty reference data measurements. The CART algorithm provides a set of rules for optimally dividing a boundary between the healthy and faulty class. The CART algorithm may create non-linear boundaries between the healthy and faulty reference data measurements that are more optimum than linear boundaries.

At each node of the CART algorithm, a determination is made about whether the measurement data meets a specific criterion. Depending on whether the measurement data meets the criterion, a tree will branch to another node where another determination is made about the measurement data. The CART algorithm continues to branch until a final determination is made about the measurement data.

Similar to the Mahalanobis distance, the CART algorithm may be applied to every vector of measurement data or pre-processed data thereof that is recorded at a certain depth or time point. The CART algorithm then renders a binary determination as to whether the measurement data is to be classified as healthy or faulty.

Figure 7:
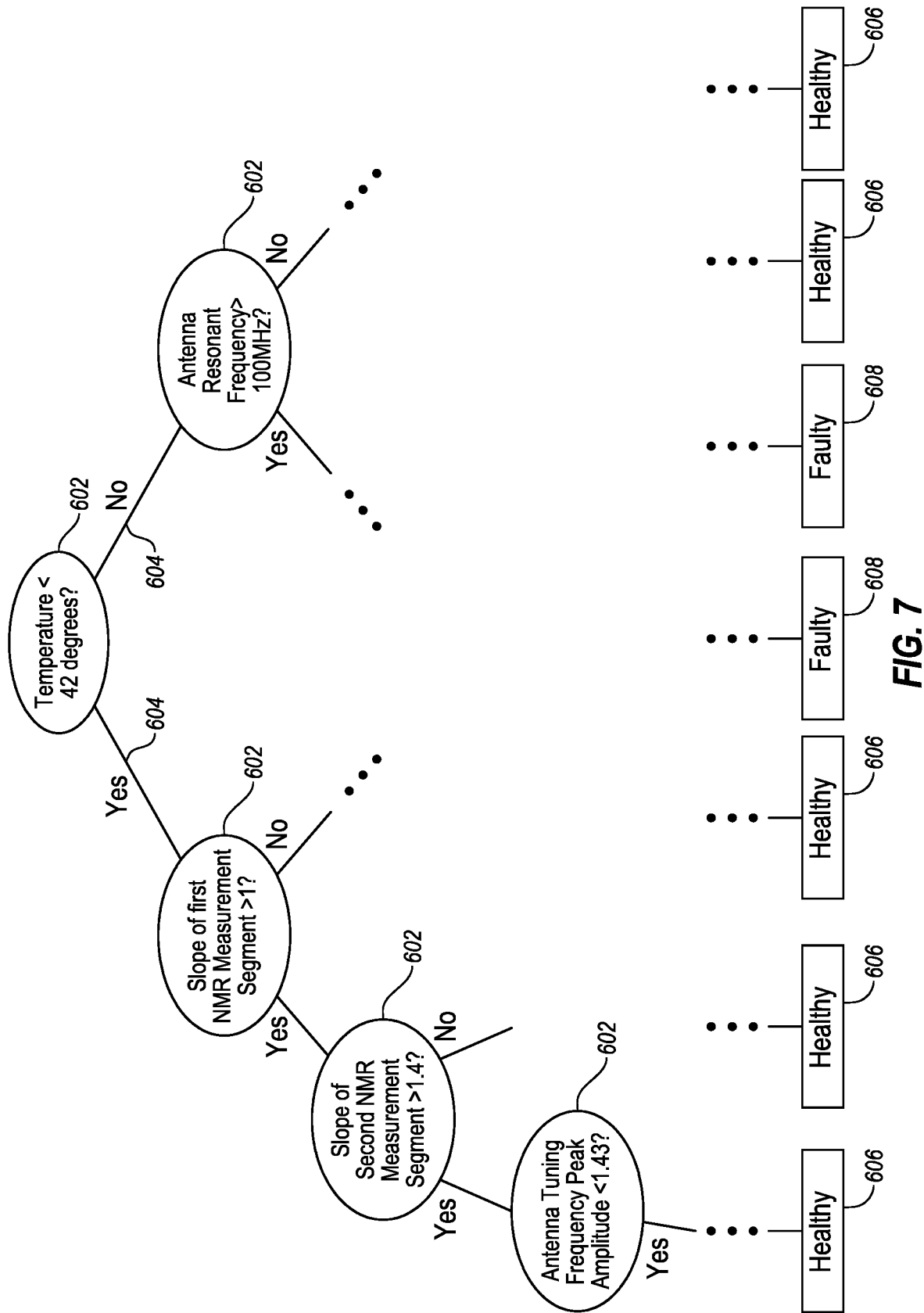
FIG. 7 depicts an example of a CART-based classification of measurement data according to one or more embodiments disclosed herein.

FIG. 7 depicts an example of a CART-based classification of measurement data according to one or more embodiments disclosed herein. After training the CART algorithm with the healthy and faulty reference measurement data, the CART algorithm develops a decision tree for determining whether measurement data is healthy or faulty. The decision tree includes a plurality of nodes 602 to query the measurement data. Based on the outcome of the query at a node, the branch 604 of the decision tree is followed to a subsequent node 602, where the measurement data is queried again. The branches 604 of the decision tree are followed until the tree terminates and the measurement data is classified as healthy 606 or faulty 608.

Following training the CART algorithm, the decision tree is provided to the detection system 102 described with reference to FIG. 1. As shown in the example of FIG. 7, the detection system 102 initially determines whether the measured temperature of the measurement data is greater than 42 degrees. If a positive determination is made, the detection system 102 determines if the slope of the first NMR measurement segment is greater than 1 and depending on the outcome of the query, the detection system 102 queries the measurement data in accordance with another node of the decision tree.

If, on the other hand, a negative determination is made, the detection system 102 determines if the antenna resonant frequency of the measurement data is greater than 100 MHz. Depending on the outcome of the query, the detection system 102 queries the measurement data in accordance with another node of the decision tree. The branches 604 of the decision tree are followed to respective nodes 602 until the decision tree terminates with a classification indicating whether the measurement data is determined to be healthy 606 or faulty 608.

Figure 8:
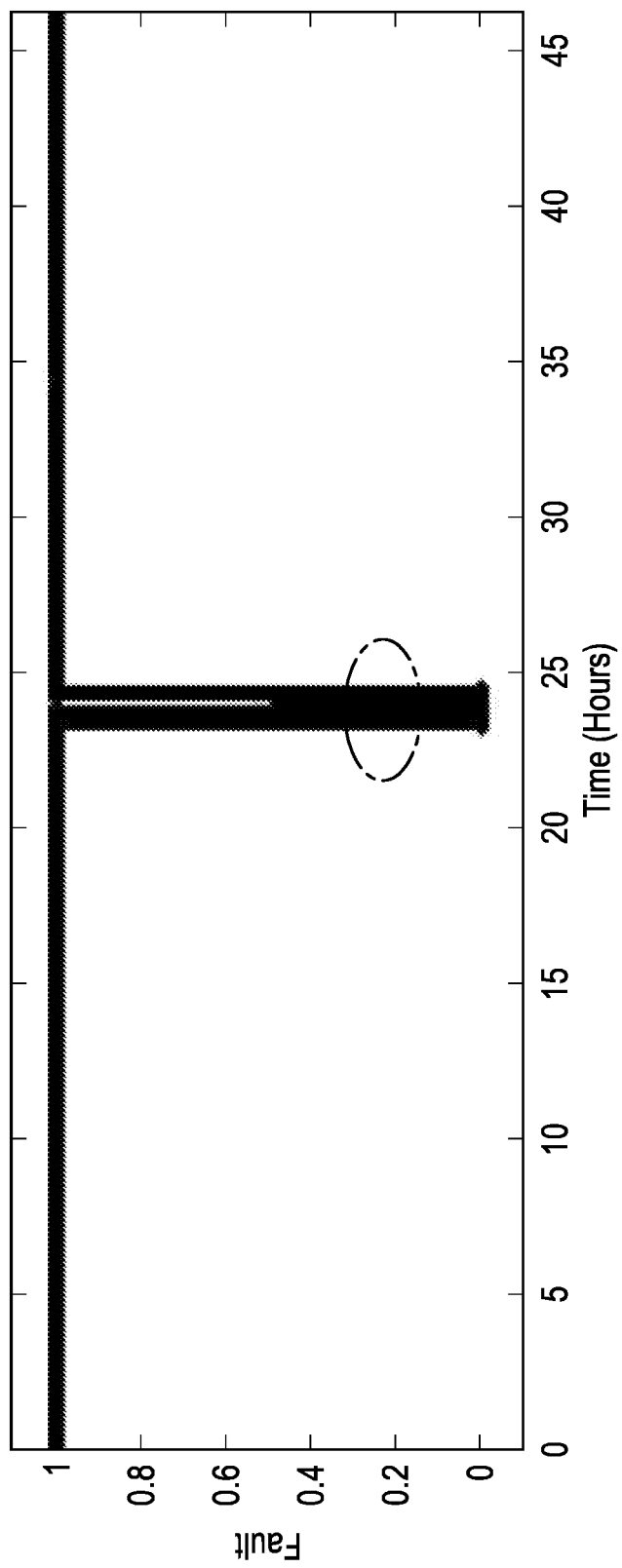
FIG. 8 depicts measurement data classification using the CART algorithm according to one or more embodiments disclosed herein.

FIG. 8 depicts measurement data classification using the CART algorithm according to one or more embodiments disclosed herein. In FIG. 8, a value of '1' indicates healthy measurement data, whereas a value of '0' indicates faulty data. As illustrated in FIG. 8, the majority of the measurement data recorded by the downhole tool 102 is healthy with the exception of the measurement data recorded between the 22nd and 25th hours of operation, which is classified as faulty. The outcomes of the classification by the CART algorithm may be used to generate a report indicating that the downhole tool 102 should be serviced or repaired.

In addition to classifying the data as healthy of faulty, the CART algorithm may be used by the detection system 106 to identify the channels of the measurement data that contributed to the determination of a faulty classification. The CART algorithm may provide the detection system 106 with a weight associated with each channel of measurement data. The weight may indicate the degree to which the channel of measurement data contributed to the faulty classification rendered by the CART algorithm.

Figure 9:
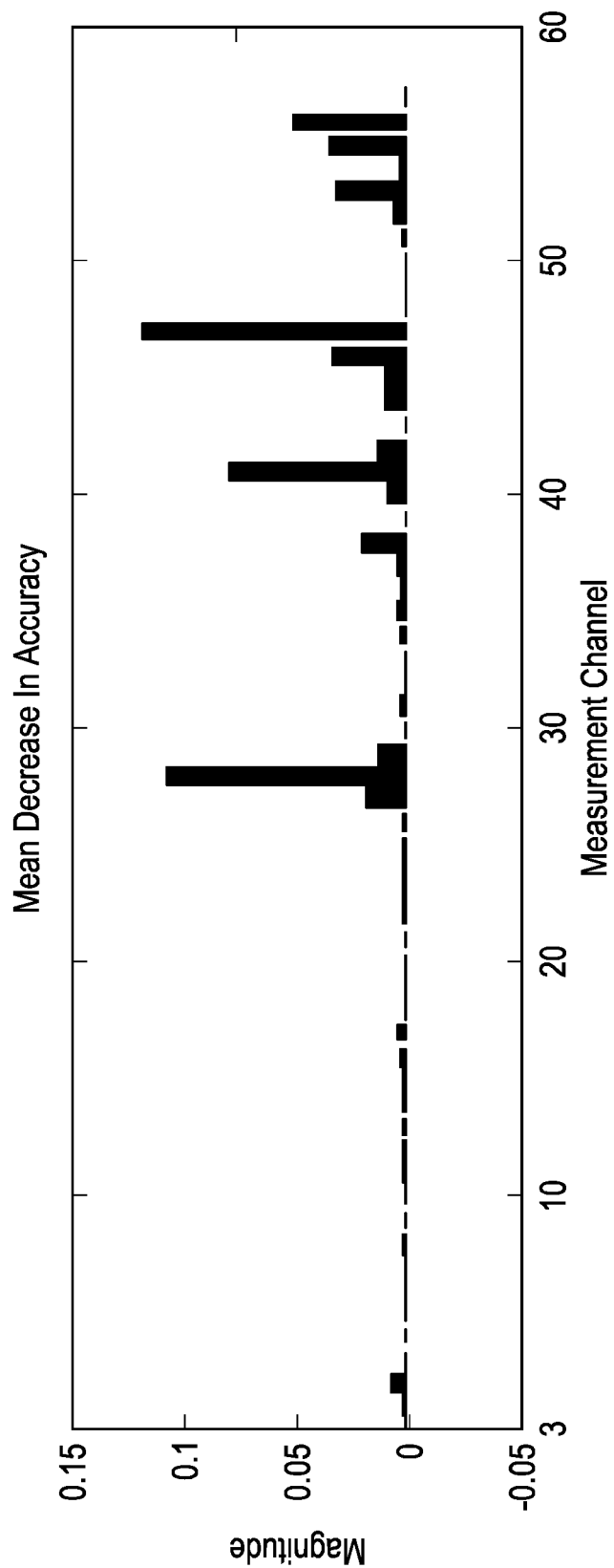
FIG. 9 depicts magnitudes by which channels of measurement data contributed to a faulty classification according to one or more embodiments disclosed herein.

FIG. 9 depicts magnitudes by which channels of measurement data contributed to a faulty classification according to one or more embodiments disclosed herein. In FIG. 9, the measurement data has 57 channels. Three of the channels were associated with a relatively high contribution to the faulty classification of the measurement data. The identification of the primary contributing channels to the faulty classification may be provided in a report generated by the detection system 106. Further, the identification may be used by personnel for the repair or maintenance of the downhole tool.

In addition, the identification of the primary contributing channels may be a signature or a pattern associated with a certain malfunction of the downhole tool 102. Different malfunctions of the downhole tool 102 may introduce different noise or errors in the measured data. When a particular malfunction occurs, a pattern of noise or errors may introduced in the measured data. The pattern may be detected by the detection system 106 as a result of performing the CART algorithm on the measured data and identifying the contribution of the channels of the measurement data. The pattern may be used to pinpoint the malfunction of the downhole tool 102 that resulted in the measurement data being classified as faulty.

It is noted that various classification algorithms, such as the random forest algorithm, may be trained with the healthy reference data and the faulty reference data to obtain a classifier usable to classify the measurement data. Further various combinations of classification algorithms may be used. For example, a multiple tree structure of the same classification algorithm or of differing classification algorithms may be implemented.

A few example embodiments have been described in detail above; however, those skilled in the art will readily appreciate that many modifications are possible in the example embodiments without materially departing from the scope of the present disclosure or the appended claims. Accordingly, such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scope of the disclosure and the appended claims. Additions, deletions and modifications to the embodiments that fall within the meaning and scopes of the claims are to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, or the combination of any two upper values are contemplated. Certain lower limits, upper limits and ranges may appear in one or more claims below. Numerical values are "about" or "approximately" the indicated value, and take into account experimental error, tolerances in manufacturing or operational processes, and other variations that would be expected by a person having ordinary skill in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include other possible embodiments along with the full scope of equivalents to which such claims are entitled. Accordingly, the claims are not limited by the disclosure.

The invention claimed is:

1. A method for detecting while drilling an anomaly in measurement data captured by a downhole tool, comprising:
obtaining, while drilling, the measurement data, the measurement data comprising a plurality of measurement channels for a time point of a plurality of time points at which measurements were recorded;
obtaining reference data including healthy reference data and faulty reference data;
pre-processing the measurement data by modeling at least one measurement channel of the plurality of measurement channels using modeling parameters to produce pre-processed measurement data;
determining a first distance between the pre-processed measurement data and the healthy reference data;
determining that the first distance exceeds a first threshold for the first distance;
in response to determining that the first distance exceeds the first threshold for the first distance, determining a second distance between the pre-processed measurement data and the faulty reference data;
determining whether the second distance exceeds a second threshold;
generating, while drilling and in response to determining that the first distance exceeds the first threshold for the first distance, a first report indicating detection of the anomaly in the measurement data;
generating, while drilling, a second report indicating faulty measurement data in response to determining the second distance does not exceed the second threshold distance; and
initiating service or repair of the downhole tool based at least in part on one or more of the first and second reports.

2. The method of claim 1, wherein the pre-processing of the measurement data further includes:
determining a correlation coefficient between a first measurement channel of the plurality of measurement channels and a second measurement channel of the plurality of measurement channels;
determining whether the correlation coefficient exceeds a threshold for the correlation coefficient; and
excluding at least one of the first measurement channel and the second measurement channel from the pre-processed measurement data if the correlation coefficient exceeds the threshold for the correlation coefficient.

3. The method of claim 1, wherein the at least one measurement channel comprises an array of measurements and wherein modeling the at least one measurement channel further includes linearly fitting at least one segment of the array and representing the at least one segment by the modeling parameters that include a slope and an intercept.

4. The method of claim 1, wherein the first distance is a Mahalanobis distance.

5. A system comprising:
a measurement data storage that stores measurement data for a plurality of depths of a downhole tool, wherein the measurement data comprises a plurality of measurement channels for each depth of the plurality of depths;
a reference data storage that stores healthy reference data for each depth of the plurality of depths and faulty reference data;
a detection system, coupled to the measurement data storage and the reference data storage, that:
obtains the measurement data from the measurement data storage;
obtains the healthy reference data and the faulty reference data from the reference data storage;
pre-processes the measurement data by modeling at least one measurement channel of the plurality of measurement channels using modeling parameters to produce pre-processed measurement data;
determines a first distance between the pre-processed measurement data for each depth of the plurality of depths and the healthy reference data for each depth of the plurality of depths;
determines that the first distance exceeds a first threshold for the first distance;
in response to determining that the first distance exceeds the first threshold for the first distance, determines a second distance between the pre-processed measurement data and the faulty reference data;
determines whether the second distance exceeds a second threshold; and
outputs, while drilling, a first report indicating detection of an anomaly in the measurement data in response to determining that the first distance exceeds the first threshold, and outputs, while drilling, a second report indicating faulty measurement data in response to determining that the second distance does not exceed the second threshold distance,
wherein one or more of the first and second reports corresponds to scheduling of a service or repair of the downhole tool.

6. The system of claim 5 wherein the measurement data is captured at a first time point of a plurality of time points for which measurements are captured and the report indicates detection of the anomaly at the first time point.

7. The system of claim 5 wherein the first distance is a Mahalanobis distance and the plurality of measurement channels include a Nuclear Magnetic Resonance measurement made by the downhole tool and a tuning measurement and resonant frequency of an antenna of the downhole tool.

8. The system of claim 5 wherein the at least one measurement channel comprises an array of measurements and wherein modeling the at least one measurement channel further includes linearly fitting at least one segment of the array and representing the at least one segment by the modeling parameters.

9. The system of claim 5 wherein the pre-processing of the measurement data further includes:
determining a correlation coefficient between a first measurement channel of the plurality of measurement channels and a second measurement channel of the plurality of measurement channels;
determining whether the correlation coefficient exceeds a threshold for the correlation coefficient; and
excluding at least one of the first measurement channel and the second measurement channel from the pre-processed measurement data if the correlation coefficient exceeds the threshold for the correlation coefficient.

10. A method for detecting while drilling an anomaly in measurement data captured by a downhole tool, the method comprising:
obtaining, while drilling, the measurement data, the measurement data including a plurality of measurement channels for a time point of a plurality of time points at which measurements were recorded;
obtaining reference data including healthy reference data and faulty reference data;

training a classification algorithm using the healthy reference data and faulty reference data;
pre-processing the measurement data by modeling at least one measurement channel of the plurality of measurement channels using modeling parameters to produce pre-processed measurement data;
determining whether the measurement data is classified as healthy or faulty based at least in part on evaluating the pre-processed measurement data using the classification algorithm;
assigning, using the classification algorithm, a weight to each measurement channel of the plurality of measurement channels, the weight indicating a degree to which data from a respective measurement channel contributed to the determination of healthy or faulty measurement data;
outputting, while drilling, a report indicating that the measurement data is faulty and identifying at least one of the plurality of measurement channels based on the assigned weight, in response to determining that the measurement data is classified as faulty; and
initiating service or repair of the downhole tool based at least in part on the report.

11. The method of claim 10 wherein the evaluating of the pre-processed measurement data using the classification algorithm further includes querying the plurality of measurement channels at a plurality of nodes of the classification algorithm.

12. The method of claim 10, wherein the classification algorithm is a classification and regression tree (CART) algorithm or a random forest algorithm.

13. The method of claim 10 wherein the at least one measurement channel comprises an array of measurements and wherein the modeling of the at least one measurement channel further includes linearly fitting at least one segment of the array of measurements and representing the at least one segment by the modeling parameters.

14. The method of claim 10, wherein the at least one measurement channel comprises an array of measurements and wherein the modeling of the at least one measurement channel further include representing the array of measurements by a peak amplitude of the array of measurements and a frequency of the array of measurements.

* * * * *